United States Patent Office 2,721,941
Patented Oct. 25, 1955

2,721,941

METHOD OF STERILIZATION

Robert C. McMaster and Radcliffe F. Robinson, Columbus, Ohio, assignors, by mesne assignments, to M & R Dietetic Laboratories, Inc., Columbus, Ohio, a corporation of Ohio No Drawing. Application October 11, 1950,
Serial No. 189,676

3 Claims. (Cl. 250—42)

This invention relates to the sterilization and preservation of materials. More particularly, it relates to the exposure to soft X-rays of pharmaceutical or similar products.

The methods of sterilization in common usage have not proved to be satisfactory in the treatment of many materials. Frequently, the chemical composition is changed. In many cases, the materials are made completely unsuitable for their intended uses. At other times the color, odor or taste are changed so that the product is undesirable for sale to the public.

One of the most common methods of sterilization involves exposure to steam. Although the high temperatures involved may prove effective in killing organisms, the heat must penetrate from the outside of the materials, a process which is very slow. In treating materials packaged in containers, particularly glass, there is a great danger of destruction of the container from the effect of the high temperature. The high temperature may also cause undesirable changes in the material treated. In addition, the necessary handling of the material is difficult and time consuming, particularly when an apparatus such as an autoclave is used, and a fast, continuous process is not possible.

Another method of sterilizing comprises the exposure of the material to ultraviolet irradiation. Rays of this type have very little penetrative power, with the result that it has proved difficult to treat materials to a depth much below the surface. Also, ordinary glass does not readily transmit ultraviolet rays. If the materials to be treated are enclosed in glass containers, special glass must be used in constructing these containers, and the increased cost deters economical sterilization.

Another method of sterilization has been bombardment by high-speed electrons. This is an expensive process. Such an electron beam also causes an increase in temperature in the materials to be treated. This may be undesirable from the standpoint of ultimate changes which may be produced in the material.

In an attempt to overcome the undesirable effect of high temperatures Tyndallization is frequently used. In this process the material to be sterilized is heated to a temperature of approximately 60° to 80° C. for a period of thirty minutes on three consecutive days. During the intervening time the material is maintained at an incubation temperature. It is immediately obvious to one skilled in the art that a very great amount of time is consumed in this procedure, and that it is entirely unsuitable for efficient commercial sterilization.

A method of sterilization satisfactory for use in the pharmaceutical and allied fields should cause no undesirable changes in the material treated.

It is, therefore, one of the objects of this invention to provide a method of sterilizing and preserving materials in which the chemical composition and structure of the treated materials, as demonstrated by the taste, odor, appearance, biological potency, etc., is not appreciably changed.

It is a further object to provide a method of sterilization and preserving materials without heating them.

Another object is to provide an economical method of sterilizing and preserving materials.

A further object is to provide a method of sterilizing materials which can readily be adapted to a continuous process.

Yet another object is to provide a method of sterilizing and preserving packaged materials.

Other objects and advantageous features will be apparent from the following description of the invention.

It has been discovered that soft X-rays are readily absorbed by materials, and that the incident radiations together with the secondary radiations emitted after this absorption have proved to be very effective in destroying all microorganisms, including the vegetative and spore forms, in these materials. This has resulted in a sterilization of the materials treated.

It has also been found that treatment by soft X-rays has been effective in killing yeasts, molds, bacteria, etc., thereby aiding in the preservation of materials by preventing fermentation or spoiling.

The soft X-rays used in practicing this invention should have wave lengths of from about 0.05 to 12 Angstrom units. Radiations having longer wave lengths have too little penetrating power to effectively sterilize very far beneath the surface of any substances exposed in them. X-rays having shorter wave lengths are less satisfactory since a larger percentage tend to pass through the materials treated without being absorbed. As a result most of the radiation is wasted and only a small percentage is utilized in the sterilization process. In addition, some provision must be made to absorb these excess radiations in order to prevent injury to personnel in the vicinity. We prefer to use X-ray wave lengths in a range of from about 0.1 to 2 Angstrom units.

Since minor amounts of soft X-rays may stimulate bacteria, it is necessary to use massive dosages of tremendous X-ray flux density for effective sterilization. Such dosages should be at least 10,000 Roentgens per minute per square inch. The use of larger amounts will decrease the time required for exposure. Very satisfactory results can be obtained by using densities of from 50,000 to 1,000,000 Roentgen units per minute per square inch.

An excellent source of these intense dosages is an X-ray tube having low inherent filtration, as for example, a beryllium window tube.

Due to the superior characteristics of these soft X-rays, as heretofore described, a wide variety of pharmaceutical materials can be treated. These materials include parenteral solutions such as liquids containing glucose, vitamins and hormones. Materials for external use such as salves and ointments also may be sterilized by this method. Satisfactory results may be obtained in treating bandages, surgical dressings, sutures, and similar materials.

Since the effect of the treatment by soft X-rays is not dependent upon temperature, the exposure may be carried out at room temperature, and no preliminary cooling or heating of the material to be irradiated is necessary.

It should be understood that the time of exposure to the soft X-rays necessary for sterilization will vary according to the material being treated, the intensity of the rays, and the viability of the organisms to be destroyed. However, for commercial operation, optimum values may be determined experimentally for given operating conditions and the treatment of particular substances.

It has been found that the time required for sterilization by soft X-ray radiations may be decreased by agitation of the materials undergoing treatment. In the case of liquids, agitation tends to increase the area of secondary radiation and results in a more uniform exposure to the radiations. The agitation also insures that all of the microorganisms are contacted by the liquid and exposed to the secondary radiations.

This agitation may be accomplished in a suitable manner by vibrating the materials or rotating or inverting the containers holding these materials. Rotating and inverting the containers may be of an additional advantage and will result in a more uniform dosage to all parts of the materials.

This agitation need not be of such intensity as to destroy the organisms. However, ultrasonic vibrations may be used for this purpose.

The penetrating power of the soft X-rays makes it possible for the materials to be treated after packaging. For example, liquids may be sealed in glass vials or ampoules and then exposed to the soft X-rays. Non-liquid materials may be packaged in closed or sealed containers and still be effectively sterilized by the soft X-rays.

The following examples will serve to illustrate this invention with greater particularity:

*Example I*

A 0.35 per cent solution of pectin containing coliform bacteria was sealed in a glass ampoule. The ampoule was exposed to X-rays at 50 kvp. and 25 milliamperes at a source-object distance of four inches. The X-rays had a wave length of about 0.247 Angstrom units. After 358 minutes all bacteria were destroyed.

*Example II*

The same solution containing coliform bacteria was treated as in Example I except that the ampoule was agitated intermtitently at about 120 cyles per second during the period of irradiation. After 70.5 minutes all the bacteria were destroyed.

*Example III*

An ampoule containing coliform bacteria in distilled water was subjected to the same X-ray radiation as was used in Example I. After 70.5 minutes, with intermittent agitation it was found that all the bacteria had been destroyed.

*Example IV*

An ampoule of distilled water containing actinomycetes was exposed to the same X-ray radiations as in the preceding examples. During exposure the ampoule was agitated for 40 minute periods with intervals of 60 minutes between. After 500 minutes, all of the actinomycetes had been destroyed.

*Example V*

A culture of Aerobacter aerogenes was exposed to a radiation of soft X-rays having a wave length of about 0.309 Angstrom units, using 40 kvp. and 25 milliamperes. After exposure for 48 seconds at a source-object distance of one inch, all of the bacteria were destroyed.

*Example VI*

A culture of Aerobacter aerogenes was exposed to a radiation of soft X-rays at 50 kvp. and 25 milliamperes (0.247 Angstrom units) at a source-object distance of one inch. After 8 seconds all the bacteria were killed.

*Example VII*

A culture of Bacillus subtilis was treated under the same exposure conditions as set forth in Example IV. After 80 seconds, the bacteria were completely destroyed.

Although specific examples have been given it is not intended that the invention should be limited thereby, since it should be obvious that differences in the materials treated, as well as operating conditions, will require variations in the time of radiation, and apparatus to achieve optimum results. While the data given in these examples have shown the sterilizing effects of treatment by soft X-rays in laboratory experiments, those skilled in the art will realize that modifications for commercial use can materially decrease the time of exposure.

Since large dosages of soft X-rays can sterilize materials in a short time, and since no preliminary heating or cooling is necessary, the method is adaptable to a continuous process. The materials may be moved within exposure range by a continuous conveyor or other similar means. Several X-ray tubes may be used simultaneously to insure the proper quantity of exposure as well as uniform fields of intensity. Means for agitation can easily be incorporated in a continuous system.

It may also be advantageous to treat materials by intermittent exposures of short duration in preference to a single exposure of longer duration of time. Such treatment may be readily adapted to this invention.

It is to be understood that while this invention has been described as relating to the sterilization of pharmaceutical materials, it is not intended to be so limited, since the process may be used with many other substances such as all materials of plant or animal origin, foods, tobacco, condimens, cosmetics, organic and inorganic chemicals, etc.

What is claimed is:

1. The method of sterilizing and preserving materials which comprises exposing them to primary radiations having wave lengths of from 0.05 to 12 Angstrom units and having an intensity of at least 50,000 Roentgen units per minute per square inch, and maintaining said exposure until all living organisms are killed.

2. The method of sterilizing and preserving materials which comprises intermittently exposing them to primary radiations having wave lengths of from 0.05 to 12 Angstrom units and an intensity of at least 50,000 Roentgen units per minute per square inch, simultaneously agitating the materials and continuing the intermittent exposure until all living organisms are killed.

3. The method of sterilizing and preserving materials which comprises intermittently exposing them to primary radiations having wave lengths of from 0.05 to 12 Angstrom units and having an intensity of at least 50,000 Roentgen units per minute per square inch and maintaining said exposure until all living organisms are killed.

References Cited in the file of this patent

UNITED STATES PATENTS

| | | |
|---|---|---|
| 1,981,583 | Craig | Nov. 20, 1934 |
| 1,982,028 | Sperti | Nov. 27, 1934 |
| 2,456,909 | Brasch | Dec. 21, 1948 |
| 2,557,662 | Kirkpatrick | June 19, 1950 |

OTHER REFERENCES

Standard Handbook for Electrical Engineers, by A. E. Knowlton, seventh edition, Aug. 1941, page 2272.